United States Patent [19]

Lewis

[11] Patent Number: 4,893,629

[45] Date of Patent: Jan. 16, 1990

[54] ULTRASONIC MEDICAL IMAGING APPARATUS HAVING A POLYVINYLIDENE FLUORIDE TRANSDUCER

[75] Inventor: George K. Lewis, Andover, Mass.

[73] Assignee: Analogic Corporation, Peabody, Mass.

[21] Appl. No.: 111,128

[22] Filed: Oct. 15, 1987

[51] Int. Cl.$^4$ .............................................. A61B 8/00
[52] U.S. Cl. ................................................ 128/660.07
[58] Field of Search ............... 128/660, 675, 630, 698, 128/660.07; 73/602, 626

[56] References Cited

U.S. PATENT DOCUMENTS

| | | | |
|---|---|---|---|
| 3,918,025 | 11/1975 | Koshikawa et al. | 73/626 |
| 3,953,825 | 4/1976 | Kino et al. | 73/626 |
| 4,191,193 | 3/1980 | Seo | 128/675 |
| 4,401,910 | 8/1983 | Beerman | 128/660 |
| 4,471,785 | 9/1984 | Wilson et al. | 73/602 |
| 4,489,726 | 12/1984 | Epstein et al. | 128/630 |
| 4,519,396 | 5/1985 | Epstein et al. | 128/698 |
| 4,583,545 | 4/1986 | Towe | 128/630 |

Primary Examiner—Francis Jaworski
Assistant Examiner—George Manuel
Attorney, Agent, or Firm—David W. Gomes

[57] ABSTRACT

An ultrasonic medical imaging apparatus provides an ultransonic transducer constructed with polyvinylidene fluoride. Circuitry is included for generating an energizing pulse for the transducer, the pulse having a predetermined period and an instantaneous frequency which is varied from a first frequency to a second frequency during the period. Circuitry is provided for digitizing electrical signals from the transducer which electrical signals represent ultrasonic reflections received by the transducer in response to the energizing pulse, and a signal processor cross-correlates the digitized electrical signals with the energizing pulse.

5 Claims, 2 Drawing Sheets

RAISED COSINE WEIGHTED CHIRP

UNWEIGHTED CHIRP

ULTRASONIC MEDICAL IMAGING APPARATUS HAVING A POLYVINYLIDENE FLUORIDE TRANSDUCER

BACKGROUND OF THE INVENTION

1. Field of the Invention

The present invention generally relates to ultrasonic medical imaging apparatus and, in particular, to such apparatus which employ polyvinylidene fluoride piezoelectric transducers.

2. Statement of the Prior Art

The significance of ultrasonic medical imaging as a safe, non-invasive diagnostic tool has increased dramatically over the past ten years due largely to the availability of affordable, high-speed image processing computers. Generally, electrical signals are generated which are used to excite a piezoelectric transducer. The transducer transmits ultrasonic energy into a patient and then receives the echos thereof from the different tissue surfaces located within the patient's body. The received echos generate electrical signals in the transducer which are then converted to digital signals and processed to form a meaningful image of the orientation of the reflective surfaces.

Heretofore, the ultrasonic transducers used have primarily been ceramic piezoelectric materials. Limits have been encountered in the use of such material, however, as it does not readily lend itself to the formation of transducers having specially designed shapes.

In an attempt to avoid these shortcomings, other materials have been experimented with including polyvinylidene fluorides ($PVF_2$). Materials of this nature may be readily formed into different shapes. Further, $PVF_2$ has a low lateral coupling coefficient which allows for the construction of transducer arrays by photolithographic techniques. They also have a good ability to withstand shock. These materials enjoy superior bandwidth properties for transmission, which is an advantage affording better resolution at greater depth. Another advantage is that they have low acoustic impedances relative to ceramics, which obviates the need for special impedance matching of the transducer to the patient's body. One material which has been used in non-ultrasonic areas is a vinylidene fluoride/trifluoroethylene copolymer ($VF_2/C_2F_3H$) which has shown increased sensitivity over other $PVF_2$ materials.

Unfortunately, the limitations of $PVF_2$ materials are significant and have thus far seriously hampered use in the medical imaging area. They suffer from very low electro-acoustic conversion efficiency and very high dielectric losses. The inefficiency limits the peak power which may be used during pulse transmission, and the dielectric losses reduce the dynamic range of the material in the reception mode. The peak power limits during pulse transmission hinder resolution at depth. Further, the improved sensitivity is still not comparable to a wide variety of piezoelectric ceramics.

SUMMARY OF THE INVENTION

Accordingly, an ultrasonic medical imaging apparatus is provided which makes use of polyvinylidene fluoride transducer materials while overcoming some of the disadvantages associated therewith. The apparatus includes an ultrasonic transducer constructed with polyvinylidene fluoride, circuit means for generating an energizing pulse for the transducer, said pulse having a predetermined period and an instantaneous frequency which is varied from a first frequency to a second frequency during the period; means for digitizing electrical signals from the transducer which electrical signals represent ultrasonic reflections received by the transducer in response to the energizing pulse; and signal processing means for cross-correlating the digitized electrical signals with the energizing pulse.

The apparatus of the present invention improves upon the energy which may be transmitted through the $PVF_2$ transducer by increasing the time duration of the energizing pulse. The broadband advantages of $PVF_2$ are taken advantage of for resolution at distance by sweeping the frequency of the energizing pulse between predetermined first and second frequencies.

BRIEF DESCRIPTION OF THE DRAWINGS

The present invention is illustratively described below with respect to the appended drawings as follows.

DETAILED DESCRIPTION OF THE DRAWINGS

Figure 1:
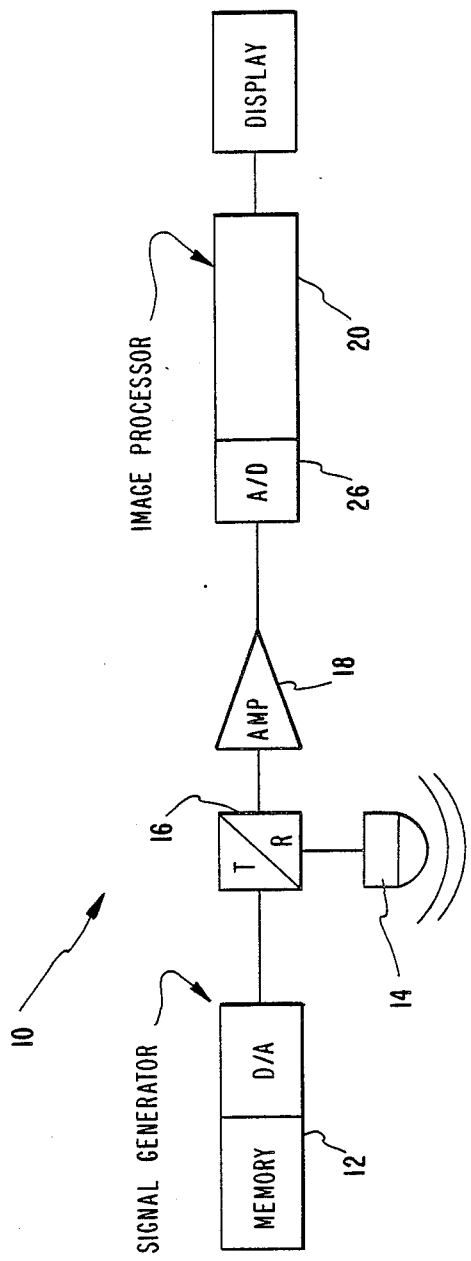
FIG. 1 is a block diagram of the apparatus of one embodiment of the present invention.

The medical imaging apparatus 10 shown in FIG. 1 generally includes a signal generator 12, a transducer 14, a transmit/receive switch 16, an amplifier 18, and an image processor 20. The signal generator 12 is capable of generating a variety of signals which have a predetermined period of pulse duration and which vary in instantaneous frequency between first and second frequencies during the period. One example of such an energizing pulse is shown at 22 in FIG. 2. This pulse has a period t and an amplitude which remains constant throughout the period t. The frequency of the pulse is shown to vary by increasing in frequency value during the period t. A second example of a suitable energizing pulse is shown at 24 in FIG. 3. This pulse also has a period t and a frequency which is increasing over that period, however, the amplitude of the pulse is weighted over the period t increasing from zero at the beginning to a maximum amplitude and back to zero by the end. The energizing pulses 22 and 24 are illustratively 20 microseconds long and are swept from 1 to 5 MHz during that 20 microseconds.

These energizing pulses are coupled by a transmit/receive switch 16 to the transducer 14. The transducer is preferably made of a variety of polyvinylidene fluoride referred to as vinylidene fluoride/trifluoroethylene copolymer. Ordinary techniques, well known in the art, may be used to construct the transducer.

The transmit/receive switch 16 couples energizing pulse both to the transducer 14 and to the image processor 20 through the amplifier 18. Image processor 20 includes an analog to digital converter 26 which converts all incoming analog signals into digital readings at sampling points. The results of this analog-to-digital conversion are then stored in a digital memory which is part of the image processor 20. Switch 16 may be constituted by any suitable circuit from a diode to an otherwise controlled solid state switch. The essential operating characteristic is that the path from the transducer back to signal generator 12 show a high impedance so that low level electrical signals from the transducer not be lost.

The energizing pulse causes the transducer 14 to transmit ultrasonic energy. This energy reflects from various surfaces such as those found between organs within a patient's body and the reflected energy returned to impact on transducer 14. This impacting energy generates an electrical signal in transducer 14 which is coupled by switch 16 to the amplifier 18. The amplified signal is digitized by the converter 26 and stored also in the memory located in the image processor 20.

Image processor 20 then cross-correlates the received electrical signal representing the ultrasonic reflection with the initial energizing pulse transmitted to transducer 14. This cross-correlation identifies the time locations of the various received, reflected ultrasonic pulses. These time locations may be further used by the image processor 20 to create a usable image of the surfaces within the patient's body which reflected the initially transmitted energy.

The energizing pulse may be generated within signal generator 12 by any suitable means known in the art of ultrasonic imaging. One suitable method is to digitally store the values of a sufficient number of points along the energizing pulse and then convert those points with a digital-to-analog converter to produce the desired waveform. One device which functions in this manner is the Programmable Polynomial Waveform Synthesizer model Data 2020 available from the Data Precision Division of Analogic Corporation of Peabody, Mass.

Figure 3:
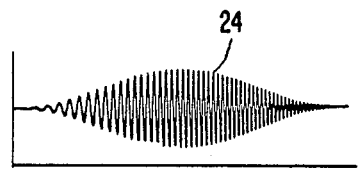
FIG. 3 is an illustration of another electrical signal provided by the apparatus of the present invention.
Figure 2:
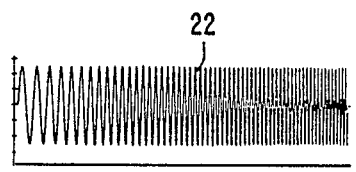
FIG. 2 is an illustration of an electrical signal provided by the apparatus of the present invention.

FIGS. 2 and 3 show two versions of the energizing pulse which may be transmitted by the apparatus of the present embodiment. The mathematical description for the pulse 22 which is a linear frequency modulated signal designated a chirp is as follows:

$$\text{Chirp}(t) = \sin 2\pi(f_o t + Kt^2/2) \tag{28}$$

The instantaneous signal frequency for such a wave is defined by:

$$f_i = (\tfrac{1}{2}\pi) d\theta/dt = f_o + Kt \tag{30}$$

The frequencies spanned by such a wave are determined by choosing appropriate values for $f_o$, the initial frequency, and K.

Figure 4:
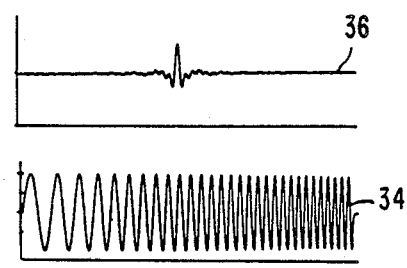
FIG. 4 is an illustration of yet another electrical signal provided by the apparatus of the present invention and the auto-correlation of that signal with itself.
Figure 5:
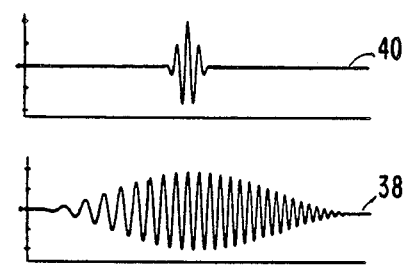
FIG. 5 is an illustration of still another electrical signal provided by the apparatus of the present invention and the auto-correlation of that signal with itself.

FIGS. 4 and 5 show the effects of cross-correlation on the various energizing pulses suggested. In each case, a pulse having a period of 10 microseconds is generated having a starting frequency of 1 MHz and a finishing frequency of 5 MHz. Energizing pulse 34 is shown cross-correlated with itself by curve 36 and weighted energizing pulse 38 is shown cross-correlated with itself in curve 40. As can be easily seen, the cross-correlated unweighted pulse 36 exhibits more ripple than the cross-correlated weighted pulse 40. This ripple or noise in the cross-correlation curve inhibits the dynamic range of the received signal and thus the weighted energizing pulse of FIG. 5 is preferred.

The cross-correlation used for the present invention may be performed by any suitable method. The long method includes "sliding" in the time domain, each received electrical signal past its corresponding energizing pulse. At predetermined points in the time domain alignment, each point of one curve is multiplied by the value aligned by it in the other curve. The products are then summed to represent the value of the cross-correlation at that one point of alignment. The curves 36 and 40 represent plots of the values determined from each point of alignment. When the two curves are perfectly aligned, the cross-correlation shows the center peak which fixes the position in time of the received pulse.

A faster method of cross-correlating for the present invention includes using the processor 20 to derive a Fourier Transform of the received and digitized electrical signal, multiplying this transform by a stored Fourier Transform of the energizing pulse and then taking the inverse Fourier Transform of the product.

The apparatus of the present invention is capable of making use of the tranducer fabricating advantages of $PVF_2$ materials while overcoming difficulties in the material's performance to make the material hereafter useful in medical imaging applications.

The embodiments of the present invention described above are intended to be taken in an illustrative and not a limiting sense. Various modifications and changes may be made to these embodiments by persons skilled in the art without departing from the scope of the present invention as defined in the appended claims.

What is claimed is:

1. An ultrasonic medical imaging apparatus comprising;
   an ultrasonic transducer constructed with polyvinylidene fluoride;
   circuit means for generating an energizing pulse for the transducer, said pulse having a predetermined length and an instantaneous frequency which is varied by said circuit means from a first frequency to a second frequency during the period;
   means for digitizing electrical signals from the transducer which electrical signals represent ultrasonic reflections received by the transducer in response to the energizing pulse; and
   signal processing means for cross-correlating the digitized electrical signals with the energizing pulse.

2. The apparatus of claim 1, wherein the means for digitizing electrical signals includes means for digitizing the energizing pulse.

3. The apparatus of claim 1, wherein the transducer is constructed from a vinylidene fluoride/trifluoroethylene copolymer.

4. The apparatus of claim 1, wherein the energizing pulse is amplitude weighted over the predetermined period.

5. The apparatus of claim 1, wherein said circuit means linearly varies the instantaneous frequency from the first frequency to the second frequency during the pulse length period.

* * * * *